United States Patent [19]

Daley, Jr.

[11] 4,038,843

[45] Aug. 2, 1977

[54] SECURITY DEVICES FOR MOUNTING CB RADIO, TAPE PLAYER, STEREO OR THE LIKE IN MOTOR VEHICLES

[76] Inventor: Richard John Daley, Jr., Rte. 2, Box 86B, Alexandria, La. 71301

[21] Appl. No.: 714,620

[22] Filed: Aug. 16, 1976

[51] Int. Cl.² .................................................. E05B 73/00
[52] U.S. Cl. ........................................... 70/58; 248/203
[58] Field of Search ............. 70/58, 258, 57, 229–232; 248/203; 312/242, 245

[56] References Cited

U.S. PATENT DOCUMENTS

| | | | |
|---|---|---|---|
| 3,673,828 | 7/1972 | Jones | 70/58 |
| 3,826,115 | 7/1974 | Davis | 70/258 |
| 3,918,599 | 11/1975 | Porter | 248/203 X |

*Primary Examiner*—Robert L. Wolfe
*Attorney, Agent, or Firm*—L. A. Proctor

[57] ABSTRACT

Apparatus useful for mounting CB radios, tape players, stereos and the like beneath the instrument panels of motor vehicles. In one of its aspects, hasp-like metal straps constitute the heart of the apparatus used to effect such mounting. In another of its aspects the CB radio, tape player, stereo or the like is retained inside a cage beneath the instrument panel. And, in another, both features are employed for such suspension and retention of said CB radio, tape player, stereo or the like.

9 Claims, 9 Drawing Figures

SECURITY DEVICES FOR MOUNTING CB RADIO, TAPE PLAYER, STEREO OR THE LIKE IN MOTOR VEHICLES

In recent years, though violent crime has received the most publicity, crimes against property have also increased to the point where it has caused widespread concern. Growing numbers of insurers have expressed the concern that if the number of property offenses does not abate, insurance may not be available to a significant segment of the population. The importance of establishing an effective federal victim-compensation program was stressed by President Ford in a message to Congress in June of last year.

Young men turned to wireless telegraphy as a hobby in the period 1903-1912 in the same spirit that their fathers had strung rooftop wire telegraphs between houses. The same type of enthusiasm has been demonstrated by the young people of the present day, as manifested by booming sales of Citizens Band (CB) radios now being installed in numerous vehicles throughout the country. Even so, the enthusiasm of recent years for tape players and stereos has far from vanished, CB radios, tape players, and stereos are now commonly purchased and the units mounted underneath the instrument panel of motor vehicles via a mounting bracket, or purchased similarly mounted in new motor vehicles. Daily newspaper and television news accounts also attests to the popularity of these devices among petty theives who find it all too easy to dislodge and remove these devices from motor vehicles for their own use, or more likely as items for quick resale. There is accordingly a need for improved mounting devices which are tamper-proof, or which at least will make the theft of these articles from motor vehicles much more difficult.

It is accordingly the primary objective of the present invention to supply this need.

A particular object is to provide new and novel devices for mounting such items as CB radios, tape recorders and stereos beneath the instrument panels of motor vehicles which will make theft of such articles much more difficult.

A further object is to provide new and novel mounting devices, as characterized, which are easy to fabricate, and install.

These and other objects are achieved in accordance with the present invention, useful for mounting CB radios, tape players, stereos and the like beneath the instrument panel of motor vehicles, which in one of its aspects is constituted of apparatus comprising a pair of hasp-like hinged metal straps, each constituted of an angular segment of metal, the two legs of which are provided with openings, a leg of each angular segment being hinged to a substantially straight segment of metal also provided with an opening, the straight metal segment of one of the hasp-like metal straps being provided with a perpendicularly projected eye opening near its terminal end. The two legs of each of the angular segments of the pair of hasp-like members are preferably disposed at right angles one to the other and mounted on opposite corners of a CB radio, tape player, stereo or the like, one or more screws being projected through each of the alternately disposed, vertically mounted legs into the CB radio or the like to retain same, after which time the hinged substantially straight straps are pivoted into vertical position to shield the screws; the members having the projected eye opening extending outwardly. The shaft portion of an elongated eye bolt is projected through openings within the vertically disposed legs of each of the angular segments, and through the eyes of a plurality of eye bolts mounted with their terminal ends projected through the openings within the horizontally mounted legs of the angular segments and openings within the instrument panel by virtue of which the CB radio, tape player, stereo or the like is suspended and retained in place. The shackle portion or a padlock can be passed through the eye of the elongated eye bolt which, when aligned with the eye located on the one straight metal segment, retains and locks the CB radio, tape player, stereo or the like in place. In another of its aspects, the CB radio, tape player, stereo or the like is retained inside a cage, and can be suspended by generally similar means.

These and other features of the invention will be better understood by reference to the following drawings, and to the following detailed description which makes reference to these drawings. Similar numbers are used in the different figures to represent similar parts or components, and subscripts to represent a part duplicated by one or more additional similar components.

Referring to the drawings:

FIG. 3 depicts a type of eye bolt of special design which aids in the locking of the mounting device to retain said CB radio, tape recorder, stereo or the like.

Figure 1:
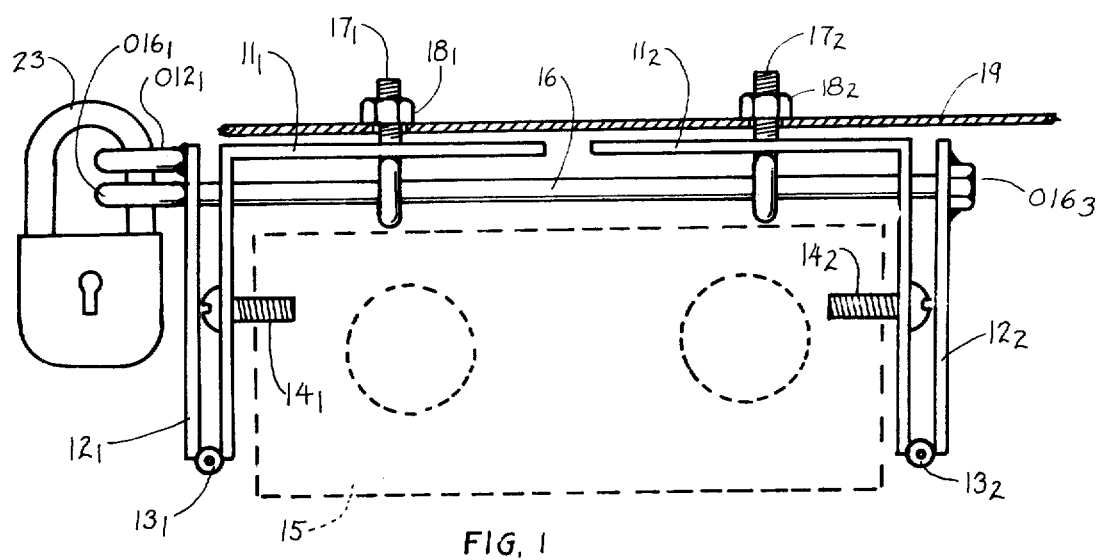
FIG. 1 depicts a front view of an improved mounting device, adapted to support a CB radio, tape recorder, stereo or the like beneath the instrument panel of a motor vehicle.
Figure 2:
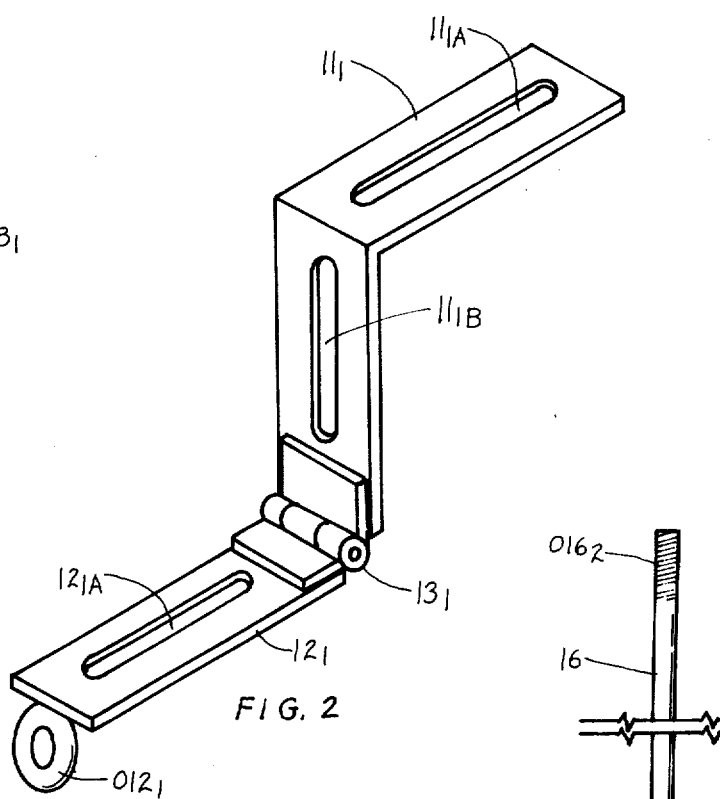
FIG. 2 depicts in perspective one of two hasp-like, hinged metal straps constituting an essential feature of the device of the preceding figure.

Referring first to FIGS. 1 and 2, there is shown an improved mounting device comprises of a pair of hasp-like hinged metal straps $11_1$, $11_2$ between which a CB radio, tape recorder, stereo or the like designated by the numeral 15 can be suspended via a pair of eye bolts $18_1$, $18_2$ from a plate 19 which is located below, or constitutes a portion of an instrument panel of a motor vehicle. One of the hasp-like, hinged metal strap $11_1$ is specifically described by reference to FIG. 2, and the other $11_2$ is of quite similar construction except for minor apparent differences which will be noted below. The hasp-like metal strap $11_1$ is constituted of an angular bracket, the two segments of which are at substantially right angles one segment relative to the other, and each segment is provided with separate closed slot openings $11_{1A}, 11_{1B}$. A metal strap $12_1$ is pivotally connected or hinged to an end of said angular bracket via a hinge $13_1$. The metal strap $12_1$ is also provided with a closed slot opening $12_{1A}$; and an eye member $012_1$ affixed to project outwardly in a plane at right angles to the plane of the metal strap $12_1$ when the hinged member $012_1$ is pivoted inwardly, and enclosed slots $11_{1B}$ and $12_{1A}$ are brought into alignment. In such design, the head of a screw $14_1$ (FIG. 1), which supports the CB radio, tape player, stereo or the like designated by numeral 15 is protected by metal strap $12_1$ from a shearing tool as might be used by a theif to dislodge the instrument 15.

Figure 4:
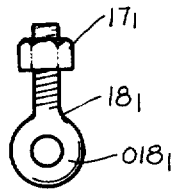
FIG. 4 depicts another type of eye bolt of type used for attachment of the mounting device beneath the instrument panel.

Referring again specifically to FIG. 1, it will be observed that the instrument 15 is secured and held between the two hasp-like hinged metal straps $11_1, 11_2$ via bolts $14_1, 14_2$ inserted respectively into the instrument 15 by passage through slots $11_{1B}, 11_{2B}$ (not detailed), and the heads thereof are protected by metal straps $12_1, 12_2$. The straps $12_1, 12_2$ are elevated and held in position via passage of an eye bolt 16 (FIG. 3) through openings $12_{1A}, 11_{1B}, 12_{2A}$ (not detailed), $12_{2B}$ (not detailed), the externally threaded end $016_2$ being retained in place via a nut $016_3$, suitably welded in place for additional strength. The opposite metal strap $12_1$ is retained in place by a padlock 23 by passage of the shackle portion thereof through the eye members $012_1, 016_1$ of the metal strap $12_1$ and eye bolt 16, respectively. The complete assembly is suspended from the plate 19 via eye bolts $18_1$ (FIG. 4), $18_2$, the shaft portion of the bolt 16 being extended through each of the eyes, the threaded portions of the eye bolts $18_1, 18_2$ extending through openings within plate 19, and the eye bolts $18_1, 18_2$ being retained in place by nuts threadably engaged therewith. The nuts can likewise be welded in place for additional security, if desired.

Figure 5:
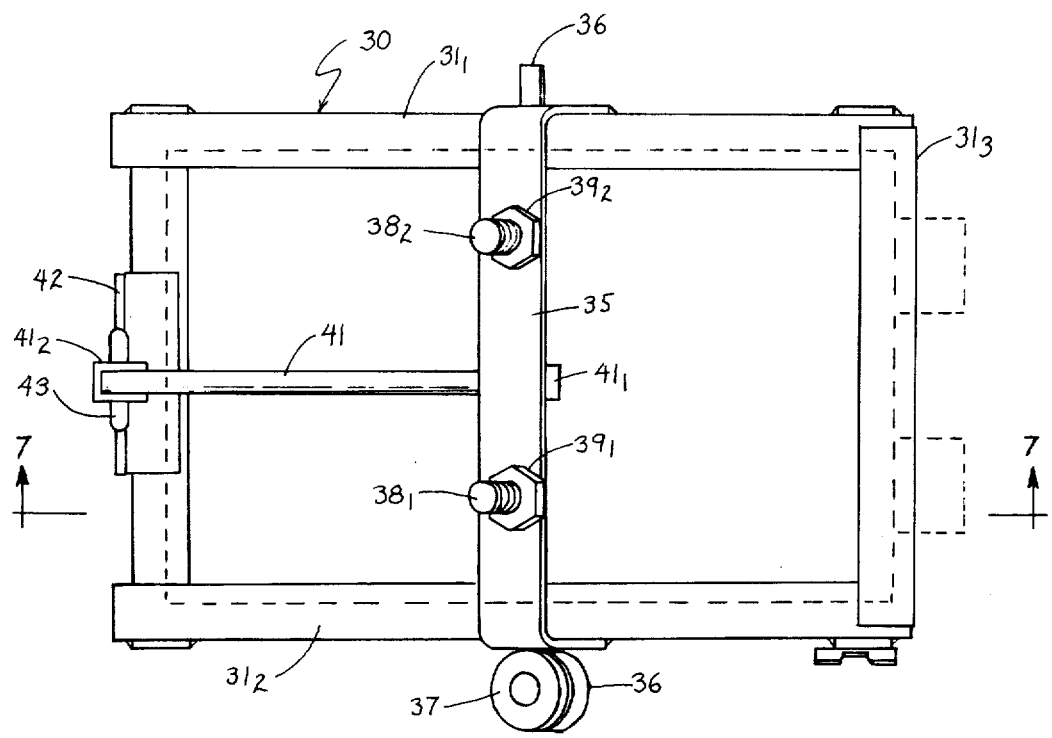
FIG. 5 depicts a top plan view of a second type of mounting device, an embodiment of cage design, for use in the suspension of a CB radio, tape recorder, stereo or the like beneath the instrument panel of a motor vehicle.
Figure 6:
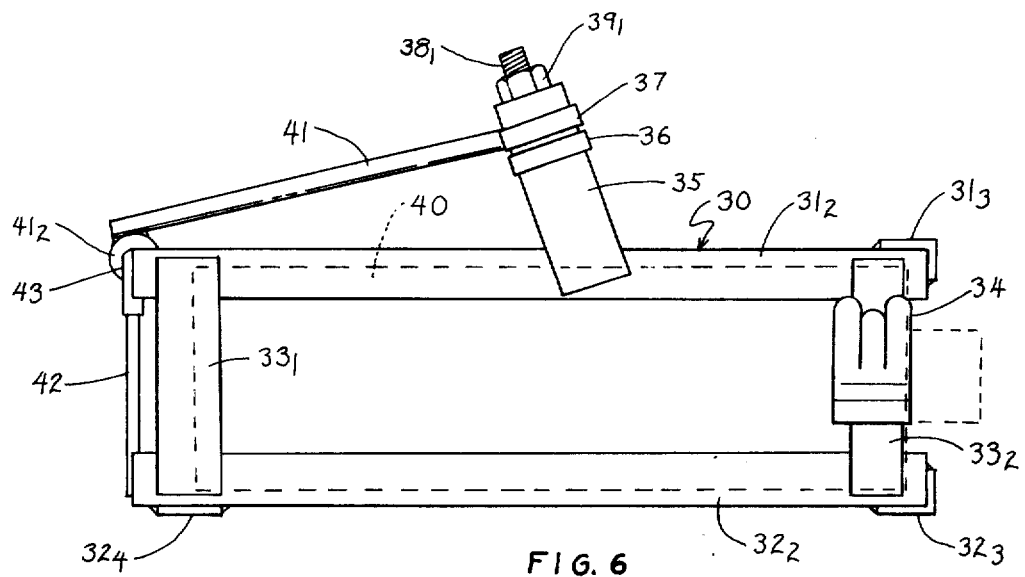
FIG. 6 depicts a lower side elevation view of the mounting device shown in FIG. 5.
Figure 7:
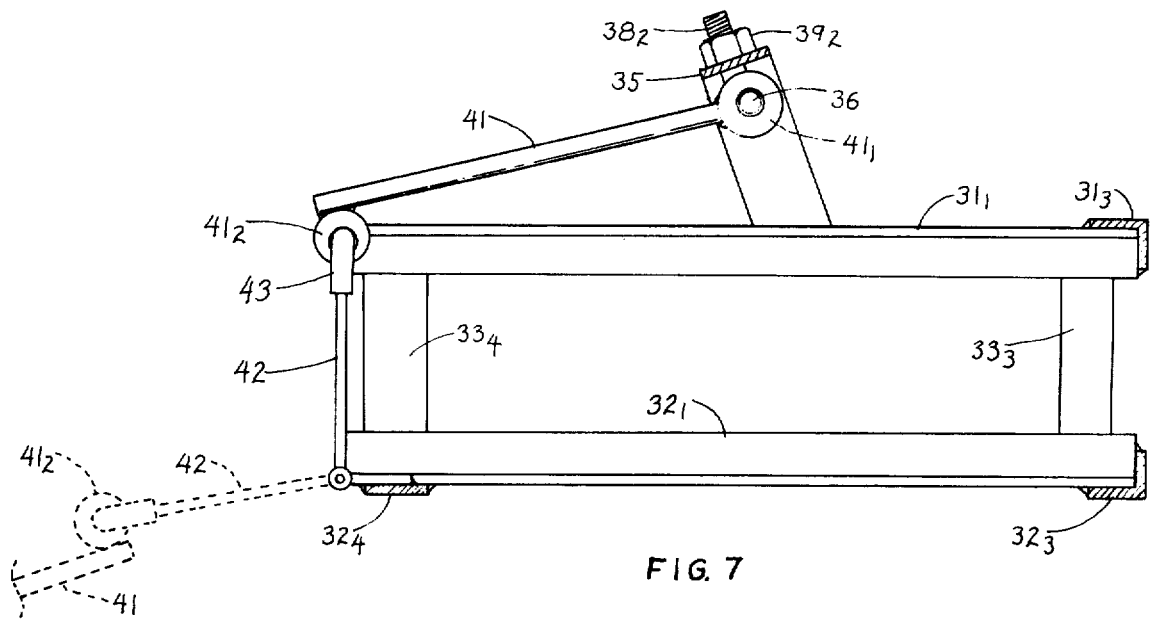
FIG. 7 is a sectional view taken along lines 7—7 of FIG. 5.
Figure 8:
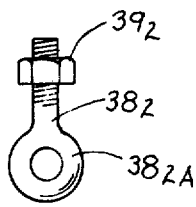
FIG. 8 depicts a type of eye bolt of type used for attachment of the mounting device beneath the instrument panel of a motor vehicle, and is similar to that depicted by reference to FIG. 4.

Referring generally to FIGS. 5–7, there is described a second type of mounting device, an embodiment of cage design, for use in mounting instruments of the classes described beneath the instrument panels of motor vehicles. In general, the mounting device 30 comprises a six-sided cage, one end of which can be opened for introduction of an instrument 15 (not shown) therein, closed, locked and the cage then suspended in place beneath an instrument panel in the manner described. The cage portion of the apparatus is thus constituted of four relatively long horizontally oriented segments of angle iron $31_1, 32_1, 31_2, 32_2$ which correspond to the length of the cage, four relatively short vertically oriented iron posts $33_1, 33_2, 33_3, 33_4$ which correspond to the height of the cage, and is located at the corners of the cage, two intermediate horizontally oriented segments of angle iron $31_3, 32_3$ which form an end and correspond to the width of the cage. A clip 34 located on metallic post $33_2$ provides a convenient means for hanging up an ear phone, ear jack, speaker or the like. The angle iron member pairs 31,32 are oriented such that the inside angle of the opposed pairs is faced toward an alternately disposed member so as to contain an instrument slipped therein, and suitably the inside angle of each member forms a right angle. The opposite end of the cage is provided with an end gate which can be lowered for receipt of an instrument of preselected size, and then raised and locked to secure the instrument in place within the cage, after which time the cage is suspended upon a plate located below the instrument panel of the motor vehicle. The end gate is constituted of a panel or frame 42 which is hinged at its lower side such that it is pivoted downwardly for opening, and upwardly for closing. The gate is pivotally connected at its upper side via a bolt 41 which contains eyes at each terminal end, one end $41_2$ of which is fitted upon the gate via a hinged connection with an inverted U-shaped member 43, the upper side of which is passed through the eye $41_2$ and the lower bifurcated sides of which are affixed upon the gate 42, as by welded connection. The upper eye $41_1$ of bolt 41 is pinned, when the cage is in closed position, via a shaft 36 which is passed through openings in both sides of the curved metal band 35 which is affixed at each of its terminal ends of the outer sides of horizontally oriented metal segments $31_1, 31_2$. One end of the shaft 36 is provided with an eye, for alignment with an eye or ring-like member 37 affixed upon the metallic band 35, through which eyes the shackle portion of a padlock can be passed to lock the member, and consequently the gate in closed position. The eye bolts $38_1, 38_2$ (FIG. 8) correspond with that described by reference to FIG. 4, the bar 36 being passed through the eye portion, e.g., $38_{2A}$; the bolts $38_1, 38_2$ being projected upwardly through slots within the metallic band 35, nuts $39_1, 39_2$ being affixed to hold the cage in suspended position beneath an instrument panel of a motor vehicle.

Figure 3:
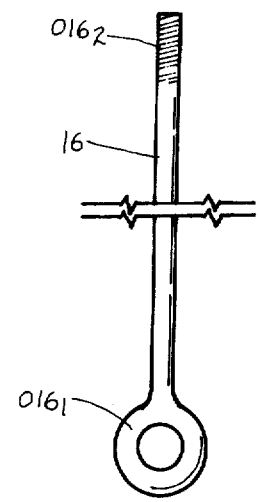
Figure 9:
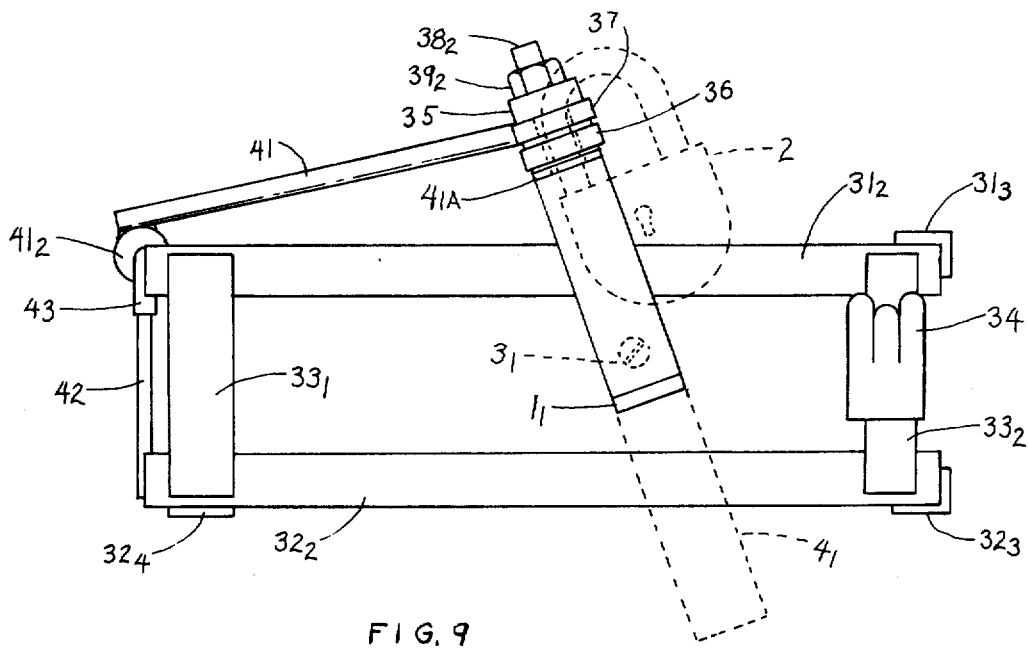
FIG. 9 is a modification of the mounting device of FIG. 5, incorporating a feature of the device depicted by reference to FIG. 1.

An especially preferred embodiment constituting the features of that device described by reference to FIGS. 5–7, and additionally certain of the features of the device described by reference to FIGS. 1–3, is embodied by the apparatus of FIG. 9. With reference to FIG. 9, the same cage with its end gate is described, the various components being referred to by the same reference numerals; and these need not be repeated. The embodiment of FIG. 9 differs from the cage device previously described, however, in that the two terminal ends of the metal bands 35 are extended downwardly past their points of attachment with horizontal angle iron members $31_1, 31_2$ and provided with opening through which screws $3_1, 3_2$ (not shown) can be extended for holding an instrument in place within the cage. Moreover, the lower terminal ends of the metal bands are provided with hinged straps $4_1, 4_2$ (not shown), similar to those described in FIG. 1 by reference to numerals $12_1, 12_2$. On closure of these hasp-like metallic bands $4_1, 4_2$ the shackle portion of a padlock 2 can be used to lock the metallic bands $4_1, 4_2$ in place to protect against removal of the screws $3_1, 3_2$ and to lock the cage.

It is apparent that various modifications and changes can be made, e.g., as in size, shape and materials of construction, without departing the spirit and scope of the invention.

Having described the invention, what is claimed is:

1. Apparatus for mounting a CB radio, tape player, stereo or the like beneath the instrument panel of a motor vehicle which comprises a pair of hasp-like hinged metal straps, each being constituted of an angular segment of metal, the two legs of which are provided with openings, a leg of each angular segment of metal being hinged to a substantially straight segment of metal also provided with an opening, and the straight metal segment of one of the hasp-like hinged metal straps is provided with an outwardly projected eye opening.

screws for projection through an opening in a first leg of each of the angular strips of metal of the hasp-like hinged metal straps for projection into the sides of said CB radio, tape player, stereo or the like when the pair of hasp-like hinged metal straps are oppositely disposed and the angular segments thereof are fitted to correspond generally with the corners of said CB radio, tape player, stereo or the like, eye bolts, the shaft portions being projected upwardly through the openings of the second leg of each of the angular strips of metal of the hasp-like hinged metal straps for projection through openings within an instrument panel, and means for securing the terminal ends of said eye bolts to said instrument panel for support of said CB radio, tape player, stereo or the like.

an elongated eye bolt for passage of the shaft portion thereof through the openings within said first legs of said angular straps of metal of the hasp-like hinged metal straps, and means for locking said elongated eye bolt in place.

2. The apparatus of claim 1 wherein the means for locking said elongated eye bolt in place comprises a padlock, the shackle portion of which can be passed through the eye provided upon the leg of one of said hasp-like hinged metal straps and the eye of said elongate bolt, and the padlock locked.

3. The apparatus of claim 2 wherein the non-eye end of said elongated bolt is externally threaded, and the hinged segment of said hasp-like hinged metal strap is held in place by an internally threaded nut threadably engaged therewith.

4. Apparatus for mounting a CB radio, tape player, stereo or the like beneath the instrument panel of a motor vehicle which comprises a six-sided cage-like structure having an end gate which can be opened for receipt of said CB radio, tape player, stereo or the like, and then closed to retain said CB radio, tape player, stereo or the like.

a locking member hinged upon the gate of said cage-like structure, the non-hinged end being provided with an eye, a metal band external to said cage-like structure which extends across an upper side of said cage and the terminal ends of which are affixed to oppositely disposed sides of said cage-like structure, the metal band being provided with oppositely disposed said openings which face upwardly, a ring-like member affixed upon a side of the cage-like structure adjacent an end of said metal band, a plurality of eye bolts, the shaft portions of which can be extended upwardly through said upper openings of said metal band and through openings within the instrument panel, while the eyes thereof face downwardly, for suspension of the cage-like structure to the instrument panel, an elongated eye bolt, the shaft end of which can be extended through the side openings within the metal band, through the eye opening of the locking member when the gate of the cage-like structure is closed, and through the eyes of said plurality of eye bolts whose shaft portions are extended upwardly into the instrument panel, and means for shackling together the eye portion of said elongated bolt and said ring-like member affixed upon a side of said cage-like structure to lock the CB radio, tape player, stereo or the like in place within the cage-like structure.

5. The apparatus of claim 4 wherein the three sides of the upper and lower faces of the cage-like structure are formed of sections of angle iron, the sections being oppositely disposed so that the concave side of the upper and lower sections of angle iron are faced one toward another.

6. The apparatus of claim 5 wherein the fourth side of the structure comprises a gate, the lower side of which is hinged to the bottom of the cage-like structure, such that the gate can be opened by lowering and closed by raising same.

7. The apparatus of claim 4 wherein the terminal ends of the shaft protions of said eye bolts are externally threaded and adapted for threadable engagement with internally threaded nuts for securing these members in place.

8. The apparatus of claim 4 wherein the means for shackling together the eye of the elongated bolt, and the ring-like member affixed upon the side of the cage-like structure adjacent the metal band, comprises a padlock.

9. The apparatus of claim 4 wherein the terminal ends of the metal band adjacent their locations of attachment to the cage- like structure are extended, the projected ends of the metal band are provided openings through which screws can be extended into the CB radio, tape player, stereo or the like, and the terminal ends of the extended portions of metal band are further provided with a hinged strap and a projecting ring-like opening by virtue of which the strap can be turned upwardly and locked by shackling said hinged strap to the eye portion of said elongated bolt.

* * * * *